United States Patent [19]

Mulvey

[11] Patent Number: 4,991,876
[45] Date of Patent: Feb. 12, 1991

[54] CONNECTOR ASSEMBLY FOR HOT WATER HEATERS AND OTHER APPLIANCES

[75] Inventor: Philip Mulvey, St. Charles, Ill.

[73] Assignee: Euroflex, S.A., Seine, France

[21] Appl. No.: 387,178

[22] Filed: Jul. 28, 1989

[51] Int. Cl.⁵ .............................................. F16L 13/02
[52] U.S. Cl. ..................................... 285/21; 285/39;
  285/52; 285/354; 285/355; 285/256; 285/906; 285/915
[58] Field of Search ................. 285/52, 53, 54, 256, 285/354, 341, 355, 39, 21, 906, 915; 138/109, 123

[56] References Cited

U.S. PATENT DOCUMENTS

| | | | |
|---|---|---|---|
| 2,536,552 | 1/1951 | Katz | 285/341 |
| 2,752,579 | 6/1956 | Caldwell et al. | 285/48 |
| 3,338,597 | 8/1967 | Mason | 285/52 |
| 3,408,093 | 10/1968 | Epstein | 285/52 |
| 3,519,290 | 7/1970 | Dunlop et al. | 285/354 X |
| 4,083,583 | 4/1978 | Volgstadt | 285/355 X |
| 4,159,027 | 6/1979 | Caillet | 138/123 X |
| 4,589,688 | 5/1986 | Johnson | 285/354 |
| 4,691,726 | 9/1987 | Studer et al. | 285/354 X |

FOREIGN PATENT DOCUMENTS 630903 11/1961 Canada .................. 285/256

Primary Examiner—Dave W. Arola
Attorney, Agent, or Firm—Mark I. Feldman

[57] ABSTRACT

An improved connector has a flexible braided metal hose assembly with a compression fitting or pipe fitting at one end and a special composite fitting assembly with an electrically insulating insert in a metal male outer fitting at the other end for connection to the water line of an appliance, such as a hot water heater.

15 Claims, 2 Drawing Sheets

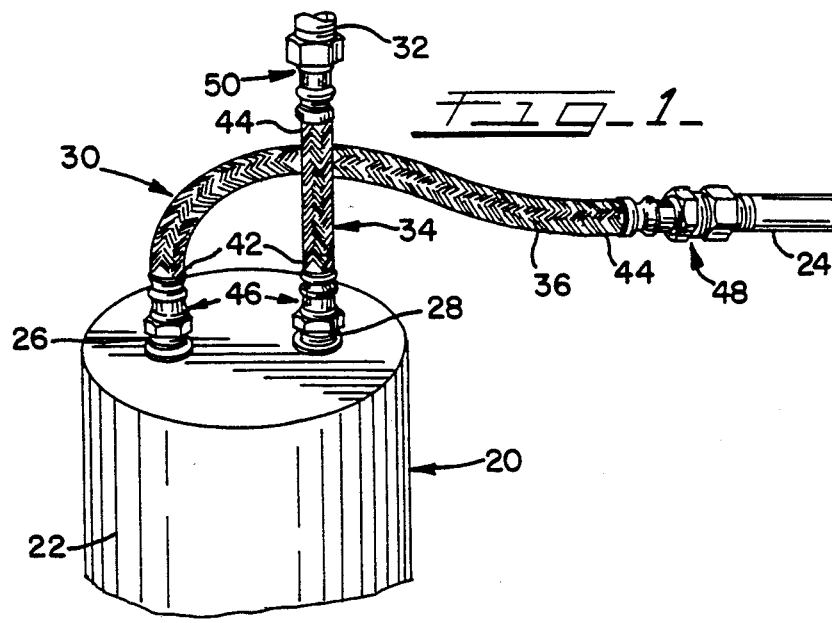
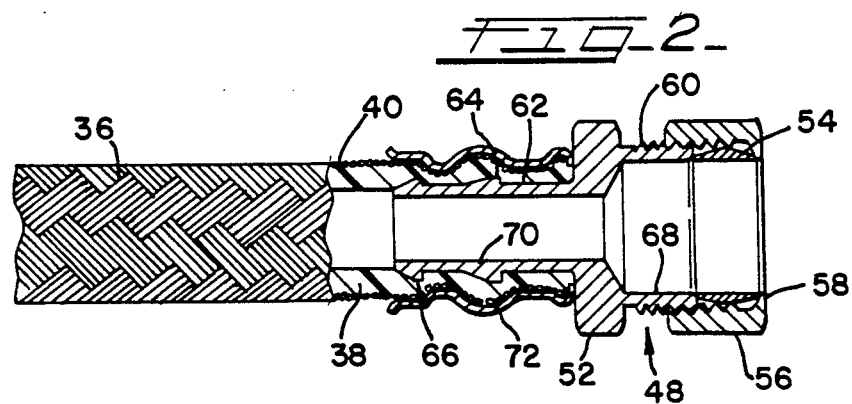
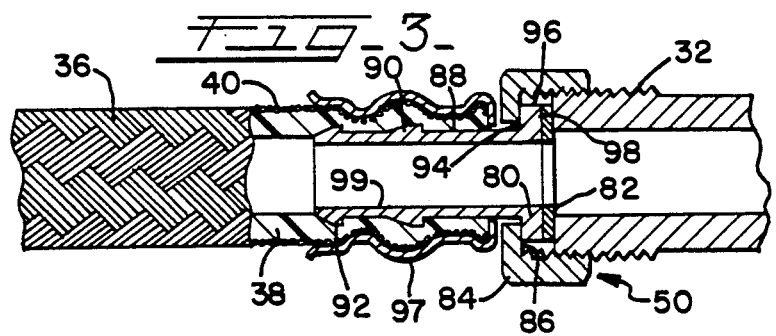
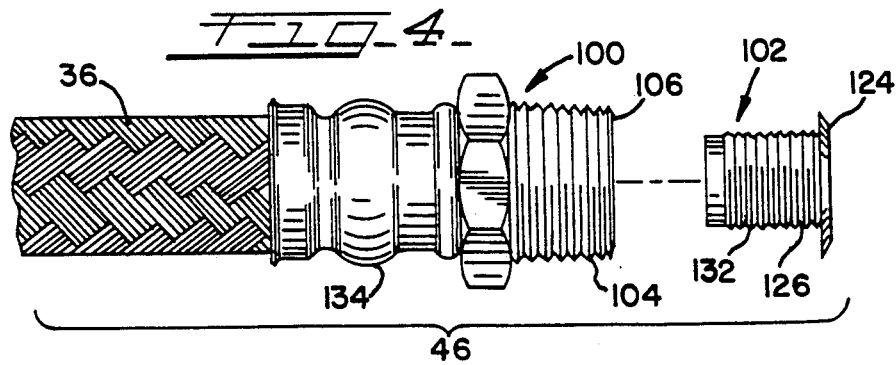

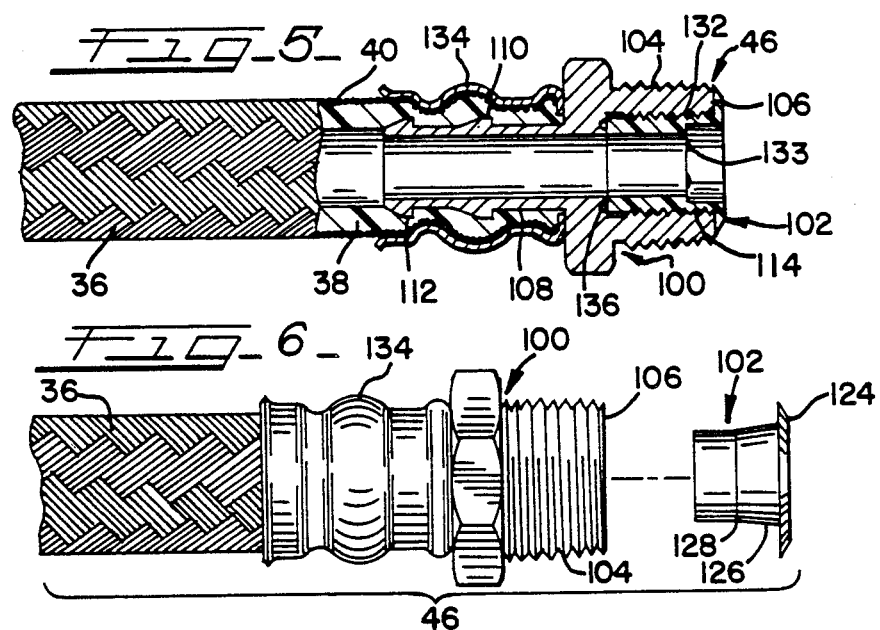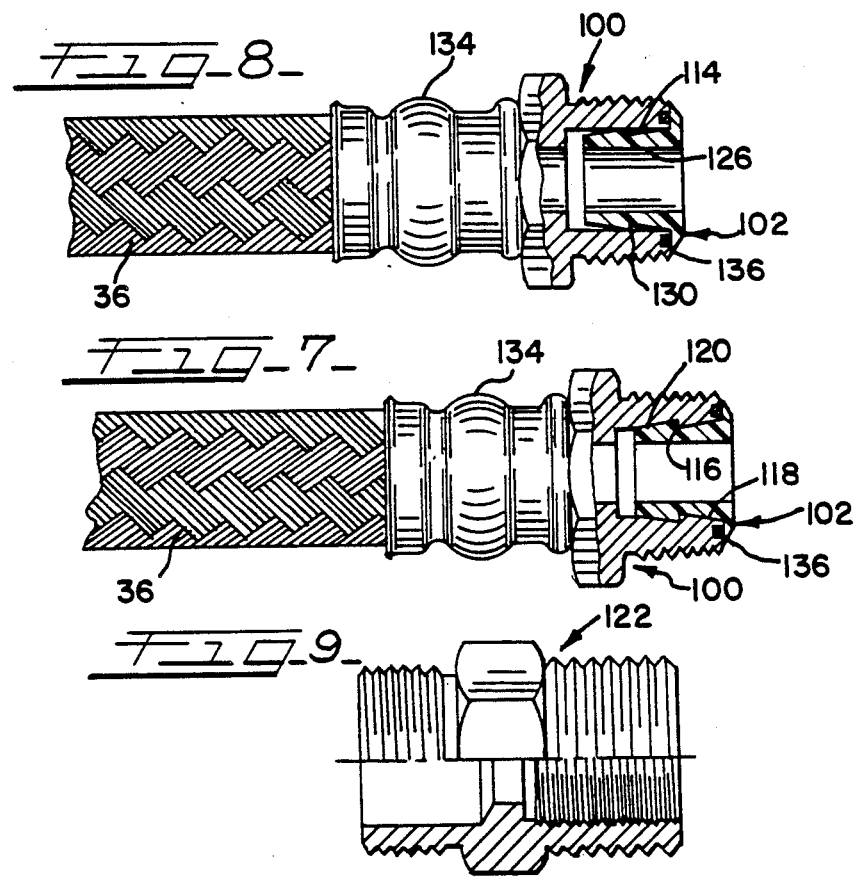

4,991,876

CONNECTOR ASSEMBLY FOR HOT WATER HEATERS AND OTHER APPLIANCES

BACKGROUND OF THE INVENTION

This invention pertains to plumbing equipment and, more particularly, to fittings for use with hot water heaters and other appliances.

Various types of storage water heaters are in common use. Typically, storage water heaters include a tank connected with a source of cold water supply, such as, for instance, a city water main, a gas burner or an electric heating element positioned adjacent the tank to heat the water, and a conductive connection between the tank and the hot water distributing system. Storage water heaters are used in private homes, condominiums, apartments, hotels and other places where a steady source of hot water is desired.

It has been long been known that when a storage water heater tank of this type is connected with a city water main, electrolytic decomposition of the tank can occur. This is primarily due to the fact that there are different kinds of metals present in the assembly, i.e., the tank may be made of iron and the pipe line connection may be galvanized iron, copper or brass.

It is often the practice to pass the cold water supply in through the top of a water heater tank by extending the tube or pipe that conducts the water, down through the tank and discharging hot water through an outlet line connected to the tank. In such an unit, if the downwardly extending pipe within the tank is a metallic electrical conductor and the tank itself is metal of a different kind, which is often the situation, then galvanic action can occur, particularly when the water in the tank is heated. This galvanic action creates electrical currents which are considerably stimulated by the fact that the incoming water pipe serves as an excellent ground for the unit. Such electrical currents tend to decompose the metal of the tank and other associated parts and fittings, with the result that leaks may develop and the tank eventually may have to be replaced or repaired.

Also, during decomposition of the metal of the tank, electrical currents tend to decompose the water in the tank, liberating oxygen which often oxidizes and corrodes the tank and associated fittings.

Presently, standard hot water heaters have a threaded female opening, such as a ¾ inch pipe thread. A flexible tube is connected to the water heater, but the end of the flexible tube also has a threaded female opening, such as a ¾ inch pipe thread. The flexible tube is connected to the hot water heater by a male nipple, such as with a ¾ inch male pipe thread at one end which is connected to the water heater and another ¾ inch male pipe thread at the opposite end which is connected to the flexible tubing. The plumbing codes for many states provide that there must be a dielectric break, which is something in the fitting to break the union between two unlike metals thereby preventing corrosion. The dielectric break for prior art is a plastic insert of plastic molding that is inserted and is not removable.

In the past, hot water heaters, sinks, wash basins, and other appliances were installed, by using a rigid pipe such as a copper pipe which was suitably bent for attachment to the end of a water distribution pipe and the water supply intake of the appliance. The plumber or other installer had to make precise measurements, cut the copper pipe accordingly, shape it and finally connect it by welding. Such tasks were burdensome, cumbersome, and slow and not readily adaptable for do-it-yourself amateurs and most homeowners.

Flexible pipes have been used for connecting appliances to a distribution network. Conventional flexible pipes have a copper tubular structure comprising corrugated walls which enable the pipe to be manually bent to the position of the fluid intake on the appliance as well as to the end of the distribution pipe. However, in order to be flexible, this type of tube has an extremely thin fragile metallic wall, which often cracks upon repetitive bending or flexing. Such cracks cause water leaks from the pipe.

The connections of appliances supplied with water using conventional metal or flexible metal pipes often transmit vibrations from the appliance.

Conventional corrugated flexible pipes have corrugated tubes and were introduced after the rigid pipe. Corrugated flexible pipes allow some degree of flexibility during installation. The body of the flexible pipe allowed some flexibility, but still many homeowners had trouble doing-it-themselves. If the corrugated flexible pipe is bent into one position, then bent again to correct a mistake in the alignment, it work-hardens the tubing. Usually, two or three bends work-hardens the tubing to its failure point. The corrugated flexible pipe often splits and forms a hole between one or more of its corrugations causing water leaks.

Conventional corrugated flexible pipes also create a great deal of turbulence in the fluid it conveys. The turbulence is caused by the corrugations of the pipe. The turbulence can decrease flow rates drastically and can also be a source of water flow noise. This noise can also be transmitted throughout the piping network.

Although a hose can be longitudinally extensible for accommodating an internal excess pressure, the flow rate will be reduced if the diameter is decreased. It is important that the flow rate be uniform. It is, therefore, desirable that a connection of this type be dimensionally stable, irrespective of the internal pressure.

Over the years various types of hoses, pipe unions, and other connectors have been suggested. Typifying these prior art hoses, pipe unions, and other connectors are those shown in U.S. Pat. Nos. 299,206; 2,257,385; 3,501,171; 3,756,628; 4,083,583; 4,159,027; 4,595,218; 4,605,248; and Re. 25,407. These prior art hoses, pipe unions, and other connectors have met with varying degrees of success.

It is, therefore, desirable to provide an improved connector assembly which overcomes most, if not all, of the preceding problems.

SUMMARY OF THE INVENTION

An improved connector assembly is provided which quickly, effectively, and safely connects tubing or a pipe to a water line of an appliance. Appliances which are useful for this invention include: a hot water heater; a hydronic heating unit, such as a gas fired boiler or tankless water boiler; heating, ventilation, and air conditioning equipment, such as a fan, cooler, blower, chiller, hot water furnace, or air conditioner. Other appliances may also be useful with this invention.

Advantageously, the inventive connector assembly is economical to manufacture, efficient, structurally strong, and reliable. The novel connector assembly is also easy to install and use.

To this end, the novel connector assembly comprises a hose assembly, preferably a flexible composite conduit hose assembly, with a special composite fitting assembly at one end for connection to the appliance, such as a water heater, or to the appliance's water line. The other end of the hose assembly can have a compression fitting assembly for direct connection to a hose or tubing, such as copper tubing, or can have a threaded pipe fitting assembly for threaded connection to a pipe.

Desirably, the special composite fitting assembly has an electrically conductive tubular outer fitting, preferably comprising a metal shell, and an electrically insulative tubular insert, preferably comprising a plastic inner fitting. The outer fitting has an externally threaded water line-engaging portion, a conduit-receiving portion with an outer face and an internal cavity or chamber which receives the insert. The inner fitting comprising the insert has a flange which is positioned against and seats upon the face of the outer fitting and has an elongated tubular body which extends from the flange for positioning in the internal cavity or chamber of the outer fitting.

The flexible tube or hose assembly has a dielectric like or dielectric style connector at one end. In contrast to the prior art flexible tubes which have a female fitting at one and, the hose assembly of the present invention has a male outer fitting at one end. In addition to being threaded on the outside, the connector can be threaded on the inside. A plastic piece (insert) can be screwed into the inside of the male fitting in order to provide a dielectric style break. The dielectric like break does not have to be positioned at the joinder of the two unlike metals and can be positioned inside the connector. The flexible hose assembly with the connector at one end has a male fitting that is adapted to be received in the female fitting of the water heater, other appliance, or pipe. This eliminates the need for a separate element to join the flexible tube to the water heater, and thereby results in cost savings and ease of assembly.

In the preferred form, the composite conduit comprises a flexible braided metallic hose assembly with a flexible inner tube comprising a water-impervious elastomeric core and a flexible outer sheath or shell comprising interlocking strands of wire. The wire can be made of copper, brass, aluminum or other metal, and is preferably made of stainless steel for best results. The elastomeric core preferably comprises by weight: from about 20% to about 40% ethylene propylene polymer resin, from about 20% to about 30% paraffin-oil, and from about 30% to about 50% carbon black. The elastomeric resin can also include the usual vulcanization additives. The flexible core can also be manufactured from thermoplastic rubber or thermoplastics.

The flexible outer protective shell provides a sheath formed of a metallic braid comprising strands of stainless steel wire. Each strand comprises between 3 and 8 parallel wires. Desirably, the strands form intersecting helices. Each strand follows a line which forms an angle between 35 degrees and 50 degrees with respect to the axis of said hose. The strands surround the elastomeric core without discontinuity to assure a continuous flexible protective shell around the elastomeric core.

Desirably, the novel connector assemblies can b ⓡused for connecting an appliance supplied with both a hot water distributing network and/or a cold drinking water network. The primary use for the flexible hose and fittings are to connect water lines of appliances, such as water heaters. The flexible hose and fitting can be made in several different pipe sizes. They can be used to make connections to various appliances or they could function as part of the piping system itself.

The composite fitting assembly has two distinct parts: a metallic outer shell and a nonmetallic insert that is interconnected to the outer shell. The interconnection can be made by threads. Alternatively, an adhesive-type and/or snap-in connection can also be achieved by placing barbs on the inside of the metallic shell and then welding, such as sonic welding, the nonmetallic insert to the metallic barbs. The metallic shell can also be constructed and arranged to allow for the use of an O-ring as a backup seal. In the preferred form, the metallic shell comprising the outer fitting is internally threaded to accept the externally threaded nonmetallic insert. The metallic shell is preferably manufactured from ASTM Bfree cut brass. The brass can also be plated. Other types of brass or other metals can be used.

Preferably, the metallic shell is fabricated with a hose barb to accept the flexible hose, but it could also be fabricated with threaded ends in the form of an adapter union. The adapter union can be sold separately from the flexible hose. As an adapter union the fitting would be used to connect appliances or as a part of the piping system itself. p The electrically insulating inner fitting comprising the nonmetallic insert is preferably manufactured of nontoxic, nonconductive plastic, such as polysulfone. In some circumstances, it may be desirable to use other materials. The insert can have a cylindrical body with external threads. In some circumstances, the insert may be manufactured for a snap fit or press fit or for connection with glue or a marine adhesive. In such circumstances, the cylindrical body can have barbs instead of threads. If the insert is sonic welded into the metallic shell, the insert can have a cylindrical tapered body with no threads. The insert can also be constructed and arranged to allow for the use of an O-ring as a backup seal.

The inner fitting comprising the nonmetallic insert can have a radial flange which covers the face of the metallic shell. The thickness of the flange preferably decreases radially along its length, allowing for engagement in the threads of the mating appliance or pipe. The thickness of the flange can also be tapered at an angle. The outside diameter of the flange is greater than the average pitch diameter of the mating appliance or pipe. This allows the flange to be caught between opposing thread flanks. It also serves the purpose of isolating the metallic shell from the mating appliance or pipe. Once isolated, the insert will maintain a watertight integrity between itself and the mating appliance or pipe and the metallic shell. Preferably, the insert is manufactured to allow interference in the threaded area between the metallic shell and the insert. This effectively blocks the path for the water to escape between the insert and the metallic shell. In some circumstances, it may be advantageous to apply a sealant in this threaded area to further assure watertight integrity of the connection. An alternate design also allows the use of an O-ring to assure a watertight seal.

The flange also holds the insert in place when fluid flow is perpendicular to the flange. Desirably, the flange is supported by the face of the metallic shell when the direction of flow is from the flange to the body. When the direction of flow is opposite, i.e. from the body to the flange, the flange is secured by the opposing thread flanks. The insert is also secured by the interference thread connection between the insert and the metallic shell.

In the preferred form, the insert has a key slot which allows rapid insertion into the metallic shell by an assembly tool. If the insert is made without threads in a snap type or an adhesive type design, the key slot can be eliminated, if desired. Also, if the insert is sonic welded into the metallic shell the key slot be eliminated, if desired.

Assembly and insertion of the insert is preferably intended to be a factory installation. Preferably, the insert is permanently connected and is not intended to be replaceable nor tampered with is field use. Nontoxic adhesive sealant may be used to maintain watertight integrity or to make the insert tamper resistant.

The composite fitting, while not a true dielectric functions as a dielectric fitting to stop electrolytic action caused by a fluid coming into contact with dissimilar metals. The composite fitting accomplishes this by separating the metals inside the pipe with a nonconductive insert. A true dielectric fitting will separate the metals inside the pipe but, it will also isolate the two metals on the exterior of the pipe.

Desirably, the flange is tapered at an angle to allow for engagement in the threads of the mating appliance or pipe. The outside diameter of the flange is preferably greater than the average pitch diameter of the mating appliance or pipe. This permits the flange to be caught (wedged) between opposing thread flanks. Advantageously, the insert serves the purpose of isolating the metallic shell from the mating appliance or pipe.

A more detailed explanation of the invention is provided in the following description and appended claims taken in conjunction with the accompanying drawings.

BRIEF DESCRIPTION OF THE DRAWINGS

FIG. 1. is a perspective view of a part of a hot water heat equipped with connector assemblies in accordance with principles of the present invention;

FIG. 2 is a cross-sectional view of a compression fitting assembly;

FIG. 3 is a cross-sectional view of a pipe fitting assembly;

FIG. 4 is a perspective view of a composite fitting assembly with an externally threaded, insulating inner fitting (insert) before being inserted into an electrically conductive, internally threaded, outer fitting;

FIG. 5 is a cross-sectional view of the composite fitting assembly of FIG. 4 after the externally threaded, insulating inner fitting (insert) has been threaded (inserted) into the electrically conductive, internally threaded, outer fitting;

FIG. 6 is a perspective view of a composite fitting assembly with a tapered non-threaded, insulating inner fitting (insert) before being sonic welded into the electrically conductive, outer fitting;

FIG. 7 is a cross-sectional view of a composite fitting assembly with an insulating inner fitting (insert) which has been sonically welded or otherwise snugly inserted against the internal hose barbs of an electrically conductive, outer fitting;

FIG. 8 is a cross-sectional view of a composite fitting assembly with an insulating inner fitting (insert) having a hose barb which has been press fit, glued, or otherwise snugly inserted into the electrically conductive, outer fitting; and FIG. 9 is a cross-sectional view of a composite fitting assembly as an adapter union.

DETAILED DESCRIPTION OF THE PREFERRED EMBODIMENT

An appliance, such as a hot water heater 20 is shown in FIG. 1. The hot water heater 20 can comprise a hot water tank surrounded by an insulating jacket or housing. The hot water tank can be heated by a gas burner. The hot water heater can have a primary anode, a drain line, a draft hood, and a vent pipe.

A water conduit comprising copper tubing 24 provides the cold water supply line to the water heater 20. The hot water heater 20 has a cold water inlet line 26 comprising a short conductive pipe, nipple, or female fitting which can be conductively connected to the water supply line (copper tubing) 24 by means of a connector assembly 30 in accordance with this invention.

A water conduit comprising an externally threaded pipe 32 provides the hot water outlet line from the water heater 20. The hot water heater 20 has a hot water exit line 28 comprising a short pipe, nipple, or female fitting which can be conductively connected by means of a connector assembly 34 in accordance with this invention.

The incoming cold water supply can be discharged into the tank adjacent the lower portion. A dielectric tube can be held in the short nipple or female fitting in conductive connection with the incoming flow of cold water to the tank. The dielectric pipe or tube can be open at its lower end within the tank adjacent the lower portion of the tank. The dielectric pipe or tube can be made of any one of several suitable materials, such as, heat resisting glass, baked ceramic materials such as porcelain or clay, or it could be a molded material or composition, such as Bakelite, plastics, or it could be made of cast material, cement mixture, or other materials.

The connector assemblies 30 and 34 and the dielectric pipe or tube eliminates the tendency to set up an electrolytic or galvanic action within the tank which may occur if a metal pipe, copper tubing, or other metal conduit is inserted into a metallic tank.

The novel connector assemblies 30 and 34 provide for easy installation and connections of a water line with a hot water heater or other appliance. The connector assemblies 30 and 34 are well adapted to be used by plumbers and do-it-yourself amateurs alike.

A hot water flexible connector assembly and unit 34 (Figure 1) is connected to the outlet hot water line 24 of the hot water heater 20. A cold water flexible connector assembly and unit 30 is connected to the inlet cold water line 26 of the hot water heater 20. The hot and cold water connector assemblies 30 and 34 can be structurally similar.

The connector assemblies are also useful for connection to other appliances, including a hydronic heating unit, such as a gas fired boiler or tankless water boiler, or to heating, ventilation, and air conditioning equipment, such as a fan, cooler, blower, chiller, hot water furnace, or air conditioner, or some other appliance.

Each of the connector assemblies 30 and 34 and has an elongated, composite flexible hose assembly providing a flexible braided metallic hose, tube, or conduit which is shown in greater detail in FIGS. 2, 3, and 5. The flexible hose assembly 36 has a tubular water-impermeable, fluid-proof core 38 made of elastically deformable resilient material such as a synthetic rubber, thermoplastic rubber, or thermoplastic. The flexible hose assembly 36 also has an outer flexible, protective, reinforcing sheath, coating, or shell 40 comprising braided metallic wires. The braided wire is preferably made of stainless steel for best results, although other types of metal wire can be used if desired.

The braided metallic hose 36 is flexible and may take any shape and configuration necessary for connecting the appliance (hot water heater) to a threaded metal pipe, copper tube, or other conduit. The flexibility of the connecting hose 36 enables the threaded rigid pipes or copper tubing to be easily connected to the water lines of the appliance thereby avoiding the bending or welding of a rigid pipe connecting section.

The braided metallic hose 36 comprising the flexible hose assembly has an inner elastomeric tube 38 providing a resiliant tubular core is made of synthetic rubber which is annularly surrounded and protected by an outer flexible metallic braided shell 40. The flexible hose 36 can be bent, twisted and curved, as appropriate, to and take all desired inflextions or incurvations necessary to approach the water lines and pipe or copper tubing. Assembly is easy and heavy equipment does not have to be used in situations for making welds or for bending the metallic connection tubes as was previously needed.

The connector assemblies 30 and 34 (FIG. 1) substantially avoid the transmission of vibrations along the pipes network in a building. The supple flexible hose by the very absorbant nature of the material of which it is constituted, avoids transmission of these vibrations and consequently the undesirable sound effects caused therefrom.

The core 38 of the hose assembly 36 is preferably made of an elastomeric resin having the following composition by weight:

from 20% to 40% ethylene propylene polymer;
from 20 to 30% paraffin-oil; and
from 30 to 50% carbon black.

The elastomeric resin can include the usual vulcanization additives.

The composition of the core 38 of the hose assembly 36 has a Shore hardness of 70, a breaking strength of 120 kg per cm$^2$ and an elongation at break of 250%.

The flexible hose assembly 36 has qualities of suppleness and elasticity which enable it to lend itself to the different deformations necessary for following the enabling the water line to be connected to the appliance.

The flexible hose assembly 36 also has the advantage of being inert (neutral) from a chemical and biological point of view and it is suitable for conveying drinking water without imparting any odor or taste.

The biological inertia of the hose (core) 38 resists the formation of efflorescence. The core 38 also enables water to be conveyed at a temperature close to 100 degrees C without producing parasitic conditions and without accelerating hardening, aging, etc.

The flexible metallic braided outer protective shell (sheath) 40 of the hose assembly 36 is made of braided strands and is mounted on the elastomeric core (tube). The sheath is made of strands comprising between 3 and 12, and preferably 9 wires. The pitch of the braiding during manufacture is 33 mm and at an angle of about 45 degrees. The braiding is effected under tension. The tension springs being calibrated between 0.450 and 700 grams. After relaxation on leaving the machine, the braiding undergoes a shrinkage which sheaths and tightens on the elastomeric core and the pitch is returned to 30 mm. The angle formed by the line followed by each strand and the axis of the hose is substantially 45 degrees. Nine wires of 0.22 mm are used for each strand. In this way, a sheath is obtained which firmly holds the elastomeric core while ensuring a good suppleness and allowing movements of flexion of the connecting hose.

The hose assembly 36 can be crimped so that the rubber core 38 is compressed by between about 45 and 50% of its thickness. This compression makes it possible to obtain a reliable crimping. If the compression of the synthetic rubber core exceeds the threshold of 50%, the elasticity of the synthetic rubber is compromised, particularly during the passage of hot water and after a succession of hot and cold cycles. The loss of elasticity of the rubber, which has been over or under compressed, may no longer assures the proper tightness and seal.

The elastomeric core (hose) 38 which conveys the water is extremely supple and of sufficient elasticity to allow the hose to adapt itself without tension to different radii of curvature. The elasticity of the elastomeric core 38 is compensated by a sheathing of the metallic braided outer shell 40 such that latter ensures the suppleness of the hose while assuring its dimensional stability and opposing any movement of extension or retraction which would adversely modify the diameter of the fluid passageway.

The flexible braided metallic composite hose, tube or conduit 38 of the flexible connector assembly 36 can be bent and twisted as needed about obstacles or other structure between the water line of the appliance and the pipe or tubing. Each flexible braided metallic composite hose 36 has an outer stainless steel braided wire outer shell 40 about an inner resilient elastomeric synthetic rubber tube 38 comprising a composite tubular core.

The hose assembly 36 (FIG. 1) has an appliance-facing end 42 for positioning adjacent the appliance 20 and a conduit-facing end 44 for positioning adjacent the conduit 24 or 32. The appliance-facing end 42 of the flexible braided metallic composite hose (hose assembly) 36 is connected to a composite fitting assembly 46. The composite fitting assembly 46 fits upon, sealingly engages, and is connected to the water line 26 or 28 of the appliance 20. The conduit-facing end 44 of the flexible braided metallic composite hose 36 is connected to a compression fitting assembly 48 or to a pipe fitting assembly 50. The compression fitting assembly 48 fits upon, sealingly engages and is connected to tubing, such as copper tubing 24. The pipe fitting assembly 50 fits upon, sealingly engages and is connected to a threaded pipe, such as an externally threaded metal pipe 32.

The fittings located at each end of the connector assembly provide high security and fluid-tight structurally strong connections by resisting fluctuations and stresses of pressure and temperature variations.

As shown in FIG. 2, the compression fitting assembly 48 comprises a compression conduit fitting 52, a compression ring (annular member) 54, and a rotatable internally threaded compression nut 56 with a collar 58 that is positioned about, against, engages, and compresses the compression ring 54 about tubing, such as copper tubing 24 (FIG. 1). The compression ring 54 can have a convex outer surface. The compression fitting 52 has an externally threaded portion 60 which threadedly receives the internally threaded compression nut 56. The compression fitting 52 also has an elongated neck or tubular portion 62 and one or more frustoconical hose barbs 64 and 66 that extend outwardly from the neck 62 to snugly engage and fit within the hose 38. The tubular compression fitting 52 has smooth internal axial passageways 68 and 70 which communicates with the hose assembly 36 and tubing 24. A tubular crimping member 72 crimps the compression fitting 52 to the hose assembly 36.

As shown in FIG. 3, the pipe fitting assembly 50 comprises a tubular threaded pipe (conduit) fitting 80, a washer (annular member) 82, and a rotatable female internally threaded nut 84 with a collar 86 to threadedly engage an externally threaded pipe 32. The pipe fitting 80 has an elongated neck or tubular portion 88 and one or more frustoconical hose barbs 90 and 92 which extend outwardly from the neck 88 to snugly engage and fit within the hose 38. The pipe fitting 80 also has a shoulder 94 which is integrally connected to the neck 88 and fits against and seats upon the collar 86 of the nut 84. The pipe fitting 80 further has an enlarged annular circular fitting head 96 which is integrally connected to the shoulder 94. The head 96 has a generally planar or flat circular face 98 upon which the washer 82 is seated. The head 96 can also have a central flared, chamfered or countersunk opening which communicates internal passageway 99 that extends through the neck 88 for communication with the hose 38 and pipe 32. A tubular crimping member 97 crimps the pipe fitting 80 to the hose assembly 36.

A composite fitting assembly 46 (FIG. 1) is connected to the appliance-facing end 42 of the braided metallic hose assembly 36 to sealingly engage and connect to the water line 26 or 28 of the hot water heater 20 or other appliance. The composite fitting assembly 46 (FIGS. 4 and 5) has a metal male, electrically conductive, tubular outer fitting 100 comprising a metal shell, preferably a brass shell, and a plastic electrically insulative insert 102 comprising a semi-rigid plastic inner fitting, preferably a polysulfone inner fitting. While the preferred shell 100 and insert 102 are made of brass and polysulfone, respectively, for best results, other materials can be used if desired.

The outer fitting 100 (FIGS. 4 and 5) has an externally threaded tubular water line-engaging male portion 104 to threadedly engage the internally threaded water line 26 or 28 (Figure 1) of the hot water heater 20 or other appliance and has a flange-receiving face 106 (FIGS. 4 and 5). A tubular elongated neck 108 (FIG. 5) integrally extends from and is in coaxial alignment with the threaded water line-engaging portion 104. Intermediate and terminal, annular, frustoconical barbs 110 and 112 extend radially and integrally outwardly of the middle and end portions of the neck 108, respectively., to snugly engage and be positioned within the core 38 of the hose assembly 36 . The threaded water line-engaging portion 104 has an internally threaded female wall portion 114 providing a chamber, cavity, or socket to receive the inner fitting (insert) 102. In the embodiment of FIG. 7, the outer fitting 100 has at least one internal annular or arcuate insert-engaging barb 116 adjacent the chamber or cavity 118 with a triangular cross section for being sonic welded to said sleeve 120 of the insert 102. It may also be desirable in some circumstances that the conduit-receiving portion of the outer fitting have an externally threaded section 122 comprising an adapter union as shown in FIG. 10.

The inner fitting 102 (FIGS. 4 and 6) comprising the insert has a deformable annular flange 124 to sealingly engage against and sit upon the flange-receiving face 106 of the outer fitting 100. Preferably, the flange 124 of the inner fitting (insert) 102 comprises an annular flange with a radially outwardly decreasing thickness. Desirably, the flange 124 further comprises deformable plastic for sealing engagement with the water line. The inner fitting (insert) 102 also has an elongated tubular body 126 which extends integrally from and is cantilevered to the annular flange for positioning in the internal chamber. When properly inserted in the outer fitting, the tubular body 126 is annular surrounded by the water line-engaging portion 104 of the outer fitting 100. The tubular body 126 of the inner fitting (insert) 102 can comprise a tapered sleeve 128 as shown in FIG. 6 which can be sonically welded, glued, or press fit (FIG. 8) (snap fit) into the internal chamber 114. The inner fitting (insert) 102 can also include at least one frustoconical annular barb 130 (FIG. 8) which extends radially outwardly of the sleeve 126 to engage the internal female wall 114 providing the chamber or cavity of the outer fitting 100.

In the inner fitting (insert) 102 of FIGS. 4 and 5, the body of the inner fitting has external threads 32 and the outer fitting 100 has internal threads 114 about the internal chamber to threadedly receive the external threads 132 of the body of the inner fitting 102. The inner fitting (insert) 102 can have one or more one key slots 133 (FIG. 5) or a hexagonal socket for insertion of a tool, such as a key, hex wrench, socket wrench, screwdriver, etc. to facilitate insertion of the insert 102.

The composite fitting assembly 46 (FIGS. 4–8) has a tubular crimping member 134 which securely crimps the outer fitting 100 to the braided metallic hose assembly 36. In the crimping process, a cylindrical tubular blank or ferrule is crimped about and form fitted snugly against the mating fittings and hose assembly to have a complementary shape thereto. The crimping process helps secure and permanently attach the mating fittings and hose assembly.

The composite fitting assembly 46 can also include an O-ring 136 (FIGS. 5, 7, and 8) to seal the insert 102 to the outer fitting 100.

The composite fitting assembly and flexible connector assemblies provide a convenient, dependable, and safe connection between the water line of an appliance and a pipe or tubing.

Among the many advantages of the novel flexible connector assemblies and composite fitting assembly are:
1. Can be manufactured in different sizes for use with hot water heaters and other appliances.
2. Superior connector and seal between appliances, pipes, and tubing.
3. Excellent structural strength and integrity.
4. Outstanding resistance to stress and failure.
5. Better protection against leaks.
6. Greater longevity and wear.
7. Easier to manufacture, store, and ship.
8. Simpler to use.
9. Easy to install and remove.
10. Convenient.
11. Economical.
12. Reliable.
13. Effective.
14. Efficient.

Although embodiments of the invention has been shown and described, it is to be understood that various modifications and substitutions, as well as rearrangements of parts, can be made by those skilled in the art without departing from the novel spirit and scope of this invention.

What is claimed is:

1. A connector assembly for connecting a water line of an appliance, comprising:

a composite fitting assembly for connection to a hose and to an internally threaded water line associated with an appliance, said appliance comprising a hot water heater;

said composite fitting assembly having a male electrically conductive tubular outer fitting and an electrically insulative tubular insert;

said male outer fitting having a tubular neck with a plurality of outwardly extending barbs including an intermediate barb and a terminal barb for engaging said hose, an externally threaded water line-engaging male portion extending from and in substantial coaxial alignment with said neck for threadedly engaging said internally threaded water line of said hot water heater, said male outer fitting having a flange-receiving face adjacent said externally threaded portion and defining an internal cavity for receiving said insert;

said insert having a flange for positioning against and seating upon said face of said male fitting and for engaging said water line of said hot water heater, said insert having an elongated tubular body extending from said flange for positioning in said internal cavity of said male outer fitting; and said composite fitting assembly including an O-ring positioned about said tubular body adjacent said flange for sealing said insert to said fitting.

2. A connector assembly for connecting a water line of an appliance, comprising:

a composite fitting assembly for connection to a hose and to an internally threaded water line associated with an appliance, said appliance comprising a hot water heater;

said composite fitting assembly having a male electrically conductive tubular outer fitting and an electrically insulative tubular insert;

said male outer fitting having a tubular neck with a plurality of outwardly extending barbs including an intermediate barb and a terminal barb for engaging said hose, an externally threaded water line-engaging male portion extending from and in substantial coaxial alignment with said neck for threadedly engaging said internally threaded water line of said hot water heater, said male outer fitting having a flange-receiving face adjacent said externally threaded portion and defining an internal cavity for receiving said insert;

said insert having a flange for positioning against and seating upon said face of said male fitting and for engaging said water line of said hot water heater, said insert having an elongated tubular body extending from said flange for positioning in said internal cavity of said male outer fitting; and said body of said insert having external threads and said fitting having internal threads about said cavity for threadedly receiving said external threads of said body of said insert.

3. A connector assembly in accordance with claim 2 wherein said outer fitting comprises a metal shell and said insert comprises a plastic dielectric-type fitting.

4. A connector assembly in accordance with claim 3 wherein said metal comprises brass and said plastic comprises polysulfone.

5. A connector assembly in accordance with claim 2 wherein said insert defines at least one slot for insertion of a tool to facilitate insertion of said insert into said outer fitting.

6. A connector assembly for connecting a water line of an appliance, comprising:

a composite fitting assembly for connection to a hose and to an internally threaded water line associated with an appliance, said appliance comprising a hot water heater;

said composite fitting assembly having a male electrically conductive tubular outer fitting and an electrically insulative tubular insert;

said male outer fitting having a tubular neck with a plurality of outwardly extending barbs including an intermediate barb and a terminal barb for engaging said hose, an externally threaded water line-engaging male portion extending from and in substantial coaxial alignment with said neck for threadedly engaging said internally threaded water line of said hot water heater, said male outer fitting having a flange-receiving face adjacent said eternally threaded portion and defining an internal cavity for receiving said insert;

said insert having a flange for positioning against and seating upon said face of said male fitting and for engaging said water line of said hot water heater, said insert having an elongated tubular body extending from said flange for positioning in said internal cavity of said male outer fitting;

said flange comprises an annular flange and said tubular body comprises a tapered sleeve sonically welded, glued, or press fit into said cavity; and said fitting having at least one internal barb adjacent said cavity for said sleeve to be welded to.

7. A connector assembly for connecting a water line of an appliance comprising:

a flexible bendable elongated braided metallic hose assembly for flexibly connecting a conduit to an internally threaded water line of an appliance selected from the group consisting of a water heater, a hydronic heating unit, and heating, ventilation and air conditioning equipment, said hydronic heating unit selected from the group consisting of a gas fired boiler and a tankless water boiler, said heating, ventilation and equipment comprising at least one member selected from the group consisting of a fan, cooler, blower, chiller, hot water furnace, and air conditioner, and said conduit selected from the group consisting of an externally threaded pipe, metal tubing, plastic tubing, and a rubber hose;

said braided metallic hose assembly having a flexible braided metallic outer sheath annularly surrounding a resilient flexible inner tube comprising a substantially water-impermeable elastomeric core, and said hose assembly having an appliance-facing end for positioning adjacent said appliance and a conduit-facing end for positioning adjacent said conduit;

a conduit fitting assembly connected to said conduit-facing end of said braided metallic hose assembly for sealingly engaging and connection to said conduit, said conduit assembly having a rotatable internally threaded compression nut with a collar, only one removable annular member, said one removable annular member being selected from the group consisting of a compression ring and a washer, a stationary tubular conduit fitting about which said compression nut rotates for receiving said one annular member, said conduit fitting having an elongated neck and at least one hose barb extending outwardly from said neck for snugly fitting into said conduit-facing end of said braided metallic hose assembly, and a crimping member for crimpingly engaging and securing said conduit fitting to said hose assembly;

a composite fitting assembly connected to said appliance-facing end of said braided metallic hose assembly for sealingly engaging and connection to said water line of said appliance, said composite fitting assembly having a metal male electrically conductive, tubular outer fitting comprising a metal shell, a plastic electrically insulative insert comprising a semi-rigid plastic inner fitting, and an annular crimping member for crimpingly engaging and securely connecting said male outer fitting to said braided metallic hose assembly, said male outer fitting having a flange-receiving face and an externally threaded tubular water line-engaging male portion integrally connected to said flange-receiving face for threadedly engaging said internally threaded water line of said appliance, said male outer member having a tubular neck integrally extending from and in substantial coaxial alignment with said externally threaded water line-engaging male portion, and at least one annular frustoconical barb extending radially and integrally outwardly of said neck for snugly engaging and positioning with said core of said braided metallic hose assembly, and said externally threaded water line-engaging male portion defining an internal chamber for receiving said plastic inner fitting; and said plastic inner fitting having a deformable annular flange for sealingly engaging against and seating upon said flange-receiving face of said male outer firring and said water line, said plastic inner fitting having an elongated tubular body extending integrally from and cantilevered to said annular flange for positioning in said internal chamber of said male outer fitting and being annular surrounded by said externally threaded water line-engaging male portion of said male outer fitting.

8. A connector assembly in accordance with claim 7 wherein said conduit comprises metal tubing, said conduit fitting comprises a metal compression fitting with external threads for threadedly engaging said compression nut, and said annular member comprises said compression ring, and said compression ring is positioned between said compression fitting and said compression nut for compressively engaging said metal tubing.

9. A connector assembly in accordance with claim 7 wherein said conduit comprises an externally threaded pipe, said annular member comprises said washer, said conduit fitting comprises a metal pipe fitting with a shoulder for engaging said collar of said nut, and said metal pipe fitting has an annular head integrally connected to said shoulder with a substantially planar face for supporting said washer against said pipe.

10. A connector assembly in accordance with claim 7 wherein said outer fitting of said composite fitting assembly comprises a brass shell and said insert of said composite fitting assembly comprises a polysulfone inner fitting.

11. A connector assembly in accordance with claim 7 wherein said tubular body of said inner fitting of said composite fitting assembly comprises a tapered sleeve sonically welded, glued, or press fit into said internal chamber.

12. A connector assembly in accordance with claim 7 wherein said body of said inner fitting has external threads and said outer fitting has internal threads about said internal chamber for threadedly receiving said external threads of said body of said inner fitting.

13. A connector assembly in accordance with claim 12 wherein said composite fitting assembly includes an O-ring for sealing said insert to said fitting.

14. A connector assembly in accordance with claim 12 wherein said flange of said plastic inner fitting comprises an annular flange with a radially outwardly decreasing thickness and said male outer fitting has a plurality of annular frustoconical hose barbs including an intermediate annular frustoconical hose barb and a terminal annular frustoconical hose barb extending radially outwardly of said neck for engaging said core of said braided metallic hose assembly.

15. A connector assembly in accordance with claim 12 wherein said inner fitting defines at least one slot for insertion of a tool to facilitate insertion of said inner fitting into said outer fitting.

* * * * *